United States Patent [19]
Müller et al.

[11] 4,384,885
[45] May 24, 1983

[54] PROCESS FOR THE RECOVERY OF METALS FROM CATALYSTS

[75] Inventors: Hans R. Müller, Oberhof über Säckingen; Bruno Krismer; Wilfried Sottman, both of Goslar, all of Fed. Rep. of Germany

[73] Assignee: Hermann C. Starck Berlin, Goslar, Fed. Rep. of Germany

[21] Appl. No.: 127,143

[22] Filed: Mar. 4, 1980

[30] Foreign Application Priority Data

Mar. 5, 1979 [DE] Fed. Rep. of Germany ....... 2908570

[51] Int. Cl.$^3$ .................... C22B 4/00; C22B 23/04; C22B 34/34
[52] U.S. Cl. .................... 75/10 R; 75/11; 75/40; 75/82; 75/84; 75/103; 75/119
[58] Field of Search .................... 75/82, 119, 84, 103, 75/10 R, 11, 10, 40; 252/411 R; 423/56, 144

[56] References Cited

U.S. PATENT DOCUMENTS

| 3,567,433 | 3/1971 | Gutnikov | 75/103 |
| 4,029,495 | 6/1977 | Hirayama | 75/82 X |
| 4,087,510 | 5/1978 | Steenken | 423/53 |
| 4,120,698 | 10/1978 | Atchison et al. | 75/82 |
| 4,138,249 | 2/1979 | Rosot | 75/103 |
| 4,214,895 | 7/1980 | Gingerich et al. | 75/119 |

FOREIGN PATENT DOCUMENTS

| 54-4010215 | 1/1979 | Japan | 75/84 |
| 296583 | 10/1969 | U.S.S.R. | 252/411 R |

Primary Examiner—M. J. Andrews
Attorney, Agent, or Firm—Wood, Dalton, Phillips, Mason & Rowe

[57] ABSTRACT

A process for the recovery of valuable metals from spent desulfurization catalyst wherein the catalyst, which has not been subjected to oxidative roasting, is thermally reduced in the presence of carbon and calcium oxide.

7 Claims, No Drawings

PROCESS FOR THE RECOVERY OF METALS FROM CATALYSTS

BACKGROUND OF THE INVENTION

1. Field of the Invention

This invention relates to a method of recovering metal values from spent catalyst and, more specifically, this invention relates to a method of extracting valuable metals from spent desulfurization catalyst by carbothermal reduction.

2. Description of the Prior Art

Desulfurization catalysts utilizing valuable metals as catalytically active components are well-known in the petroleum refining industry. Such catalysts generally comprise a carrier such as aluminum oxide ($Al_2O_3$), spinel ($MgO.Al_2O_3$) or aluminum silicates, for example, and one or more catalytically active components such as compounds (generally oxides) of cobalt, nickel, molybdenum and tungsten. Such catalysts often contain substantial quantities of $Fe_2O_3$ or other iron oxides.

In spite of repeated regeneration, the lifetime of such catalysts is limited due to the accumulation thereon of catalyst poisons, oil residues, carbon, sulfur, moisture and other impurities. Spent catalyst must periodically be replaced by fresh catalyst.

Although spent catalyst contains relatively small amounts of valuable metals, recovery of the metals is important due to the short supply and high cost thereof. Due to environmental considerations, heavy metal-containing catalyst must be disposed of under controlled conditions, often in special dump sites, usually at considerable expense. However, special dumping is not required for substantially metal-free catalyst waste.

Many methods of recovering valuable metals from catalyst wastes are known. These prior known methods each require oxidative roasting of catalyst prior to metal recovery.

One such method is described in Offenlegungsschrift No. 25 56 247 and in U.S. Pat. No. 4,087,510. In this process, spent catalysts are calcined in the presence of alkali salts, preferably soda, whereby metal oxides are converted into water-soluble alkali metal salts. Water-soluble vanadium and molybdenum salts are then obtained by leaching the residue with hot water, but cobalt is generally not recoverable. Satisfactory yields of cobalt can only be obtained if the carrier material, to which cobalt oxide is bound as spinel, is completely dissolved.

Calcining of catalyst in the presence of soda results in the formation of water-soluble alkali aluminates. If $SiO_2$ contaminants are present, alkali silicates are also formed. Therefore, vary impure metal salt solutions are obtained. Such solutions must be processed further as by precipitation of the aluminates and silicates, leading to considerable losses of molybdenum and vanadium.

Wet chemical methods are known in which spent desulfurization catalyst is treated with aqueous alkaline media without calcining in order to solubilize contaminated alkali molybdate or alkali vanadate salts. For example, in Offenlegungsschrift No. 27 35 684, an aqueous sodium carbonate solution is used. In U.S. Pat. No. 3,567,433, dissolution of molybdenum, vanadium and nickel salts is carried out in a pressurized autoclave in the presence of ammonia or ammonium carbonate. The eluted metal salts may then be subjected to further processing.

In West German Pat. No. 23 16 837, metal salts are dissolved by calcining spent catalyst in the presence of sodium chloride.

In the process of Offenlegungsschrift No. 20 13 945, $MoO_3$ is sublimed at high temperatures. Following $MoO_3$ sublimation, the remaining cobalt (which is bound to the residue as spinel) is reduced by roasting and then dissolved with a suitable mineral acid.

All known prior wet chemical methods have the common disadvantage that the highly adsorptive carrier retains substantial amounts of valuable heavy metals, thereby decreasing the yield of the metals and necessitating dumping of residues under special conditions.

In Offenlegungsschrift No. 27 44 573 a method is described in which aluminum oxide corundum, suitable for use as a grinding agent, is prepared from spent catalyst. The alloy obtained with the corundum is contaminated with aluminum, carbon and/or silicon, as well as other materials, depending on the nature of the spent catalyst. The use of such an alloy as a prealloy in the preparation of molybdenum- and cobalt-containing steels is therefore severely limited.

In such a method, sulfur present in the catalyst is transferred to the corundum phase in the form of sulfide, such as aluminum sulfide. Such sulfides are subject to hydrolytic decomposition, resulting in the production of hydrogen sulfide gas and decomposition of the corundum. Consequently, sulfur must be substantially completely removed from the spent catalyst prior to oxidative roasting, or extensive measures must be taken in order to remove the resulting $H_2S$ and $SO_2$ from waste gas.

Some known carbothermal reduction processes are carried out at elevated temperatures, e.g. above about 2000° C. However, aluminum oxide melts at about 2000° C. Carbothermal reduction of catalyst at such temperatures necessarily results in reduction of at least a portion of the aluminum oxide, as well as silicon oxides, present in the catalyst. Thus, according to methods using such high temperatures, alloys are obtained with significant amounts of aluminum and silicon, which may interfere in subsequent processing or use of the alloys.

SUMMARY OF THE INVENTION

According to the present invention, a method of recovering metal values from spent catalyst is provided wherein metals are recoverable in good yield and the resulting residue is substantially free of heavy metals.

Specifically, spent catalyst, which has not been subjected to oxidative roasting, is reduced in the presence of carbon and CaO to produce a metal phase and a slag phase. The metal phase represents an excellent yield of the metals present in the catalyst, while the slag phase is relatively lean in such metal values and may be disposed of under conventional conditions without the need for special precautions. The metal so obtained is suitable for use as a prealloy, as in steel making, or may be subjected to further treatment.

The method is preferably carried out at less than 1700° C., such that reduction of silicon and aluminum present in the catalyst is avoided.

Other objects and advantages will be apparent from the following detailed description of the invention.

DETAILED DESCRIPTION OF THE INVENTION

It has been found that high temperature reduction of spent desulfurization catalyst containing compounds of such metals as tungsten, cobalt, molybdenum, nickel and iron in the presence of carbon and calcium oxide (CaO), preferably in amounts calculated on the basis of the amounts of $Al_2O_3$, $SiO_2$ and sulfur present in the spent catalyst, results in production of a slag fraction and a metal fraction. The slag binds the sulfur present in such a way that it is not subject to hydrolytic decomposition. The metal fraction represents an excellent yield of metal values present in the catalyst, yet is not significantly contaminated with aluminum, silicon or sulfur.

The catalyst must not have been subjected to prior oxidative roasting. The presence of calcium oxide effects a substantial reduction of the melting point of the slag fraction to a point such that reduction of aluminum oxide and silicon dioxide is substantially completely avoided, while the oxides of the valuable metals are reduced substantially completely to metals. The alloy thus obtained has a very low aluminum and silicon content and is suitable for use as a prealloy, or may be subjected to further chemical processing for the separation of valuable metals, without further refining.

The amount of carbon present in the melt is preferably about the stoichiometric amount required for the reduction of the metal oxides present in the catalyst, although in practice the carbon content may vary from about 70% to about 130% of the stoichiometric amount.

The amount of CaO added to the melt is calculated on a molar basis relative to the amounts of $Al_2O_3$, $SiO_2$ and S present in the catalyst, according to the following:

$$[Al_2O_3 \cdot 0.5CaO + (CaO)_2SiO_2 + CaS] < CaO < [Al_2O_3 \cdot 1.5CaO + (CaO)_2SiO_2 + CaS].$$

Preferably, the molar amount of CaO corresponds to between about 85% to 115% of the following:

$$[Al_2O_3 \cdot CaO + (CaO)_2SiO_2 + CaS]$$

Alternatively, the moles of CaO may be expressed as follows:

$$[CaO] = a[Al_2O_3] + b[SiO_2] + c[S]$$

where [CaO] = moles CaO;
[$Al_2O_3$]—moles $Al_2O_3$ present in the catalyst;
[$SiO_2$] = moles $SiO_2$ present in the catalyst;
[S] = moles sulfur present in the catalyst;
a = a number between about 0.5 and 1.5;
b = a number between about 1.85 and 2.15, and
c = a number between about 0.85 and 1.15.

If the amount of CaO is less than or greater than the specified limits, relative to the aluminum oxide content, the slag will be subject to hydrolytic decomposition to produce hydrogen sulfide, and must be disposed of under special conditions.

It has been found that the metal phase obtained according to the invention has a very low silicon and aluminum content, and can readily be separated into its components, as by a method described in Example 1, below. The method of this invention is economical and produces no polluting gaseous or liquid waste.

Specific examples will better illustrate the practice of the invention:

EXAMPLES

Example 1

Crude, spent cobalt-molybdenum desulfurization catalyst was processed as follows without prior calcination:

The catalyst had the following composition (on a dry basis):

| | |
|---|---|
| $MoO_3$ | 10.2% |
| $Co_3O_4$ | 3.37% |
| $Fe_2O_3$ | 1.63% |
| $SiO_2$ | 2.70% |
| S | 1.78% |
| $Al_2O_3$ | 75.0% |
| ignition loss | 4.9% (partly oil residues) |

This material was melted with 35.5% CaO, based on the aluminum oxide content, and with the amount of coke necessary for the reduction of the oxides of Mo, Co, and Fe in a tippable graphite-coated arc furnace to produce slag and metal fractions.

The reduced slag, at a temperature of about 1680° C., was poured into conventional ladles. The metal was collected in the furnace until tapping became necessary. The metal and the slag fractions had the following compositions, respectively:

| (a) Metal Fraction | | | |
|---|---|---|---|
| Mo | | | 61.5% |
| Co | | | 23.5% |
| Fe | | | balance |
| Si | | | 0.26% |
| Al | | | <0.1% |
| C | | | 0.55% |
| S | | | 0.02% |
| (b) Slag Fraction | | | |
| $MoO_3$ | <0.3% | $SiO_2$ | 2.05% |
| $Co_3O_4$ | 0.27% | $Fe_2O_3$ | 0.33% |
| CaO | 33.8% | S | 1.32% |
| $Al_2O_3$ | 61.5% | C | 0.04% |
| MgO | <0.5% | | |

A sample of slag was ground and eluted with a tenfold quantity of distilled water for 24 hours with shaking. The eluate was analyzed as follows:

| Sulfur as sulfide | 0.01 mg/l | Mo | 0.02 mg/l |
|---|---|---|---|
| Sulfur as sulfate | 7.0 mg/l | Co | 0.007 mg/l |

Consequently, the slag was suitable for disposal without the necessity for special precautions.

The metal fraction had very low aluminum and silicon contents and a high concentration of molybdenum and cobalt and was suitable for use as a prealloy in steel making, or for separation into its valuable metallic components, as follows:

The metal fraction was allowed to solidify, and the brittle metal was ground to <2 mm and then subjected to oxidative roasting in a roasting furnace with stories. After the initial ignition, it was not necessary to introduce additional heat to the reaction mixture, as the oxidation reaction was exothermic.

The resulting oxide mixture had the following composition:

| | | | |
|---|---|---|---|
| MoO$_3$ | 64.6% | CoO | 20.85% |
| Fe$_2$O$_3$ | 14.1% | SiO$_2$ | 0.4% |

1000 kg of roasted material were then stirred vigorously with 2500 liters of concentrated ammonia solution for 3 hours at about 60° C. in order to leach the cobalt and molybdenum from the mixture in the form of water-soluble salts.

It was found that about 97% of the molybdenum and 95% of the cobalt present in the oxide mixture was solubilized as ammonium molybdate and hexaminecobalt hydroxide, respectively. The solution contained 135 g/l Mo and 43 g/l Co. The residue was washed and found to contain only a small amount of undissolved molybdenum and cobalt, and consisted mainly of iron oxide and SiO$_2$.

The ammonia was eliminated by evaporation and a stoichiometric amount of NaOH was added to the solution. The ammonia was recovered in a gas washer for recycling.

It was found that the ammonium molybdate was converted into sodium molybdate, and the hexaminecobalt hydroxide decomposed and the cobalt precipitated as cobalt (III) hydroxide. Both products were obtained in a chemically pure form and could be processed further in a conventional manner. Neither the gaseous nor the liquid effluent was polluted.

EXAMPLE 2 (Comparative Example)

The crude spent cobalt-molybdenum catalyst of Example 1 was coarsely sieved to remove the SiO$_2$ ceramic supporting material and was subjected to oxidative roasting in a gas-heated rotary furnace at about 1200° C. During this roasting process, the sulfur content of the catalyst decreased from 1.3% to 0.1%.

The waste gases from the furnace contained sulfur dioxide and molybdenum oxide, and were cleaned by passing through a tubular electrostatic filter and a gas washer.

The calcined catalyst had the following composition:

| | |
|---|---|
| MoO$_3$ | 11.85% |
| Co$_3$O$_4$ | 4.5% |
| Fe$_2$O$_3$ | 1.72% |
| SiO$_2$ | 2.75% |
| S | 0.1% | balance: mainly Al$_2$O$_3$.

After calcination, the catalyst was melted in a tippable, graphite-coated arc furnace together with a stoichiometric amount of carbon based on the content of molybdenum oxide, cobalt oxide and iron oxide to form metal and corundum fractions. The reduced liquid corundum was poured into ladles. The metal was collected in the furnace until tapping became necessary.

The metal and corundum fractions were analyzed as follows:

| (a) Metal Fraction | | (b) Corundum Fraction | |
|---|---|---|---|
| Mo | 48.2% | MoO$_3$ | 0.15% |
| Co | 23.0% | Co$_3$O$_4$ | <0.1% |
| Fe | 6.8% | S | 0.1% |
| C | 3.5% | | |
| Si | 7.4% | | |
| Al | 10.8% | | |

| (a) Metal Fraction | | (b) Corundum Fraction | |
|---|---|---|---|
| -continued | | | |
| S | 0.02% | | |
| | | 99.7% | |

The corundum was very impure and had an odor of hydrogen sulfide in spite of its very small sulfide content. Therefore, it could not be used as a grinding agent but was suitable for use as a blasting material.

The metal could not be used as a prealloy because of its high Al and Si contents. Successful separation of the valuable metals was impossible due to the formation of thick aluminum oxide and silicon oxide layers on the metal surfaces during oxidative roasting. The ground metal fraction could be dissolved only by treatment with nitric acid and sulfuric acid.

The foregoing detailed description is given for clearness of understanding only and no unnecessary limitations should be understood therefrom, as modifications will be obvious to those skilled in the art.

We claim:

1. A process for the extraction of metals from spent sulfur-containing catalyst, said metals being chosen from the group consisting of molybdenum, cobalt, nickel, tungsten and iron and said catalyst comprising a carrier chosen from the group consisting of oxides of aluminum or silicon or mixtures thereof, said catalyst containing oxides of said metals, said catalyst not having been subjected to previous oxidative roasting, said method comprising the steps of:
    (a) thermally reducing said metal oxides in the presence of CaO and carbon to produce a metal phase and a slag phase, the amount of said CaO being sufficient to reduce the melting point of said slag sufficiently to substantially completely avoid reduction of said oxides of aluminum and silicon while the oxides of said metals are reduced substantially completely to metal and said sulfur is substantially completely bound in said slag phase whereby said sulfur is not subject to hydrolytic decomposition; and,
    (b) separating said slag phase from said metal phase.

2. The process of claim 1 wherein the amount of CaO present is defined as $$[CaO] = a[Al_2O_3] + b[SiO_2] + c[S]$$

wherein
[CaO] = moles CaO;
[Al$_2$O$_3$] = moles Al$_2$O$_3$ present in the catalyst;
[SiO$_2$] = moles SiO$_2$ present in the catalyst;
[S] = moles sulfur present in the catalyst;
a = a number between about 0.5 and 1.5;
b = a number between about 1.85 and 2.15, and,
c = a number between about 0.85 and 1.15.

3. The process of claim 2 wherein a and c are about 1 and b is about 2.

4. The process of claim 2 wherein the amount of carbon present is between about 0.7 and 1.3 times the amount of carbon stoichiometrically required for the reduction of said metal oxides.

5. The process of claim 4 wherein said thermal reduction is carried out in an electric arc furnace at a temperature below about 1700° C.

6. The process of claim 1 comprising the further step of roasting said metal phase in an oxidizing atmosphere to produce a mixture of metal oxides substantially free of aluminum and silicon oxides.

7. The process of claim 6 wherein said mixture of metal oxides comprises oxides of cobalt or molybdenum, or both, and is leached by contact with aqueous ammonia to produce an aqueous solution of ammonium salts of said cobalt or molybdenum, and said salts are separated from said solution by evaporation of said ammonia and addition of a stoichiometric amount of sodium hydroxide to said solution to form precipitates of said salts of cobalt or molybdenum.

* * * * *